United States Patent [19]
Schroeder et al.

[11] 3,756,337
[45] Sept. 4, 1973

[54] POWER STEERING AND CONTROL THEREFOR

[75] Inventors: Robert J. Schroeder, Flossmoor; Samuel T. Comfort, Homewood, both of Ill.

[73] Assignee: Allis-Chalmers Corporation, Milwaukee, Wis.

[22] Filed: Apr. 5, 1972

[21] Appl. No.: 241,218

[52] U.S. Cl........... 180/19 S, 180/79.2 R, 280/47.11
[51] Int. Cl......................... B62d 5/06, B62d 51/04
[58] Field of Search............... 180/19 R, 19 S, 19 H, 180/79.1, 79.2 R, 79.2 A; 280/47.11

[56] References Cited
UNITED STATES PATENTS

| | | | |
|---|---|---|---|
| 1,364,872 | 1/1921 | Feightner | 180/79.1 |
| 1,948,951 | 2/1934 | Walker | 60/DIG. 2 |
| 2,362,349 | 11/1944 | Bryant | 91/438 |
| 2,742,100 | 4/1956 | Rockwell | 180/79.2 B |
| 3,056,461 | 10/1962 | Quayle | 180/79.2 R X |

*Primary Examiner*—Benjamin Hersh
*Assistant Examiner*—Leslie J. Paperner
*Attorney*—Charles L. Schwab et al.

[57] ABSTRACT

A power steering system for a walkie lift truck wherein the operator may selectively activate an electric motor driven pump to provide power steering of the walkie lift truck. The manual controls for the power steering include a pair of push button switches on the control handle whereby depressing one push button switch provides power assist to steer in one direction and depressing the other push button switch provides power assist for steering in the other direction. The hydraulic actuator for the power steering is a through rod double acting hydraulic jack having opposite ends of the rod secured to the frame of the walkie truck and the shiftable cylinder connected to the steerable power unit by a wrap-around cable. A unique pressure operated control valve is provided which has a centered float position wherein the opposite sides of the double acting steering jack are connected to one another thereby facilitating easy manual steering of the truck when power steering is not required.

4 Claims, 3 Drawing Figures

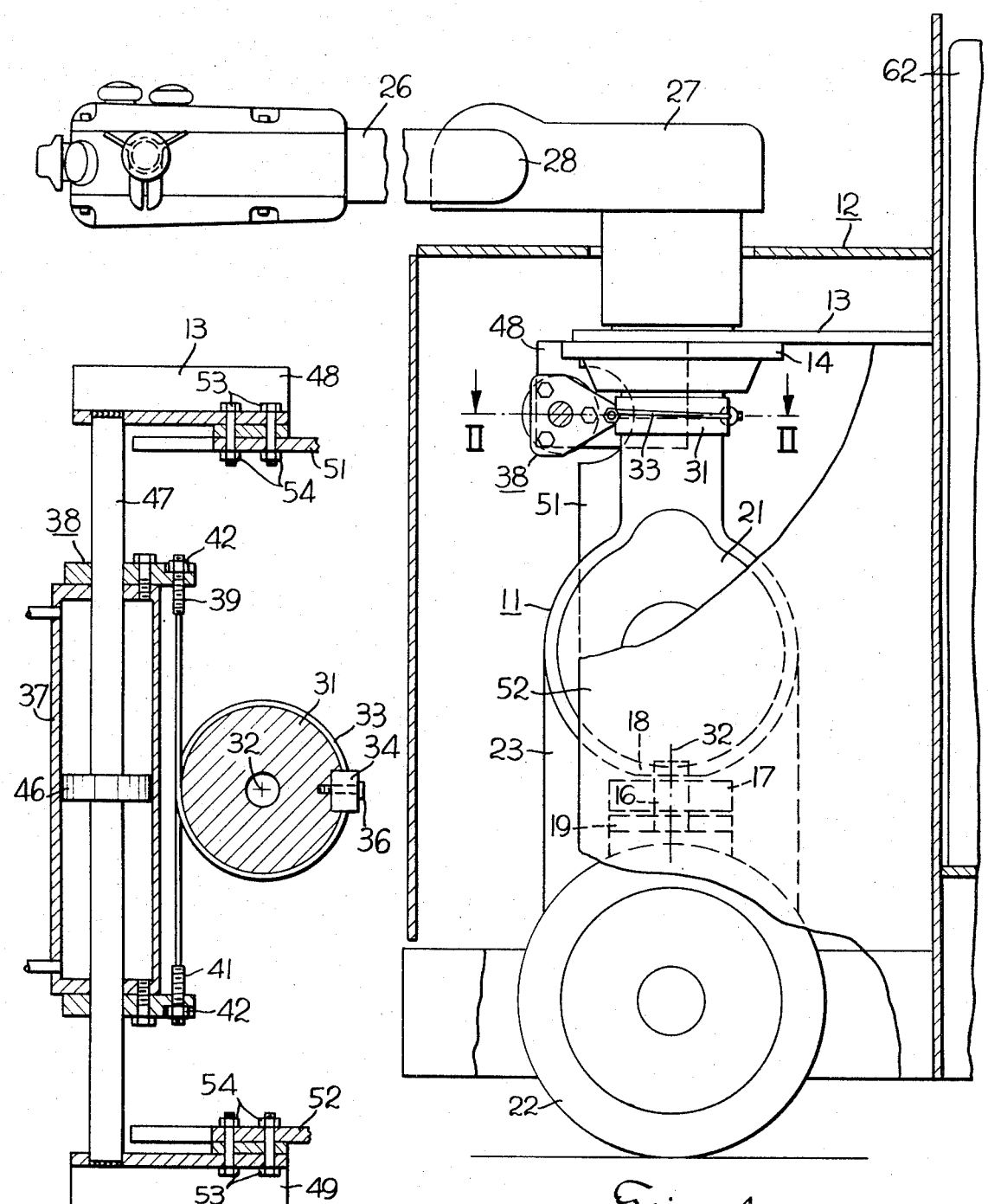

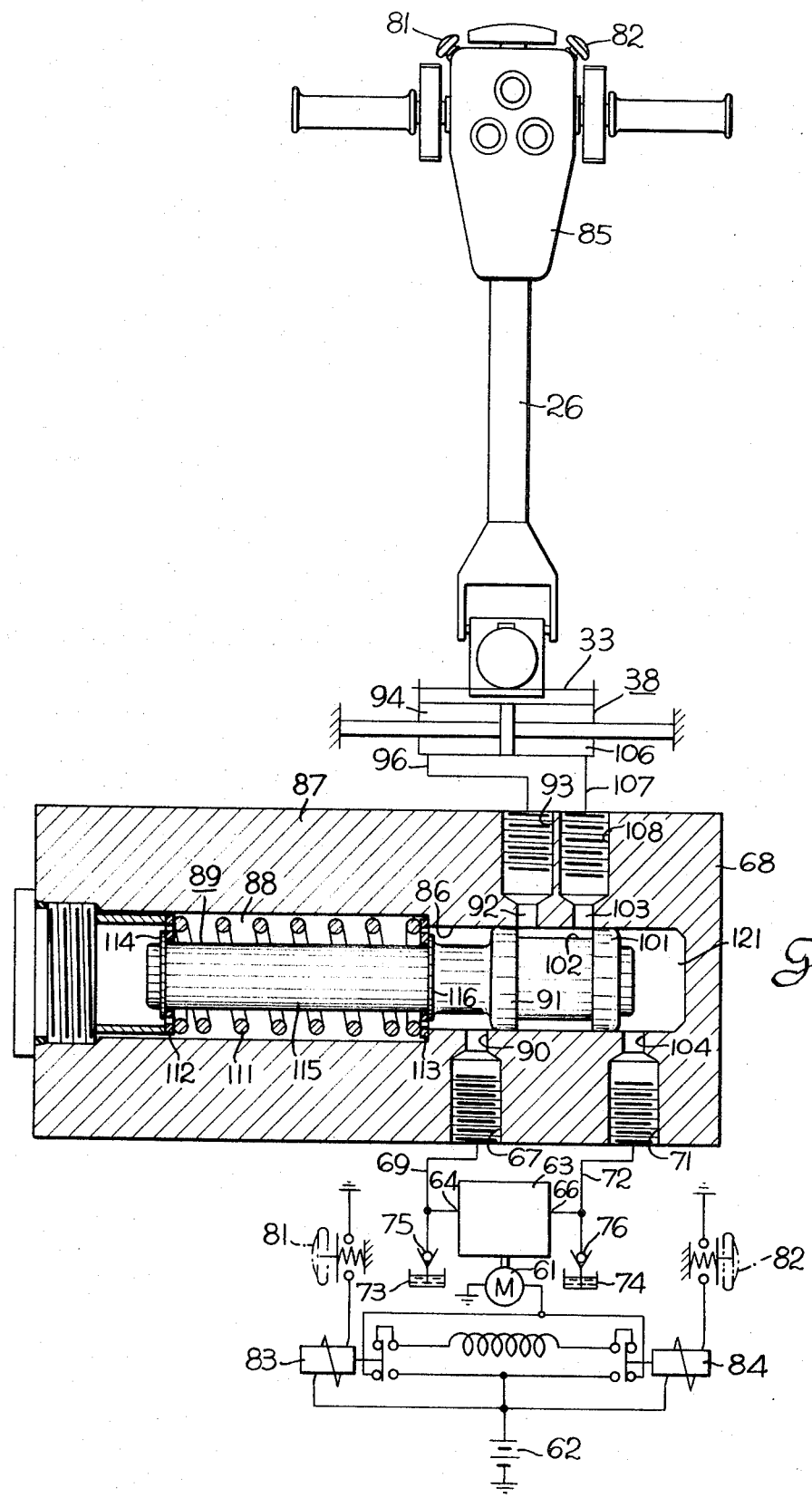

POWER STEERING AND CONTROL THEREFOR

CROSS REFERENCE TO RELATED APPLICATION

The pressure operated control valve disclosed in this application is described and claimed in an application of Dean A. Matthews, Automatic Means for Facilitating Manual and Power Modes of Operating a Device Ser. No. 241,272, filed Apr. 5, 1972.

BACKGROUND OF THE INVENTION

Heretofore, walkie lift trucks have been manufactured and sold with a control handle extending from the power unit which is also employed to steer the power unit. In some conditions of the lift truck, such as when the lift truck is near a wall and the control handle is necessarily swung upwardly to permit the truck to be close to such wall, the manual effort to pivot the truck through use of the control handle is relatively great because of the reduced lever arm. It is therefore desirable to provide some means to assist the operator to steer the unit when in such an unfavorable manual steering position. In order to conserve the life of the battery of electrically powered walkie lift trucks, it is preferable to provide selective power steering rather than automatic power steering or full-time power steering.

BRIEF DESCRIPTION OF THE INVENTION

The selective power steering of the present invention allows the operator to select the direction of power assist by pushing one of two push button switches on the control handle of the walkie lift truck. When he depresses one of the switch buttons, the electric motor drives a fluid pump in one of two opposite directions thereby causing one or the other of the opposite ends of the hydraulic steering actuator to be supplied pressure fluid by way of an automatic fluid pressure operated valve which moves from a centered float position to one of two operating positions wherein one end of the hydraulic actuator is connected to the delivery side of the pump and the other end is connected to the input side of the pump. In the centered float position of the automatic valve, both sides of the hydraulic actuator are interconnected so that manual steering of the unit will be relatively uninhibited.

BRIEF DESCRIPTION OF THE DRAWINGS

FIG. 1 is an elevation view of the power unit of a walkie lift truck in which the present invention is incorporated;

FIG. 2 is an enlarged section view taken along the lines II—II in FIG. 1; and

FIG. 3 is a schematic view of the control system of the present invention.

DETAILED DESCRIPTION OF THE INVENTION

Referring to FIG. 1, a power unit 11 is pivotally mounted on a frame 13 of a walkie lift truck 12 by an upper antifriction bearing 14 and by a pivot pin 16 interconnecting a frame member 17 with upper and lower bearing flanges 18, 19 of the power unit 11. The power unit includes an electric drive motor 21, powered by battery 62, which is connected in driving relation to a ground engaging drive wheel 22 by a gear train (not shown) enclosed within the housing 23 of the power unit 11. A control handle 26 is connected to an upper part 27 of the power unit 11 on a transverse pivoted axis 28. Referring also to FIG. 2, an upper cylindrical part 31 on the housing 23 of the control unit 11, which is coaxial with the vertical pivot axis 32 of the power unit 11, has a wrap-around cable 33 encircling it and secured thereto by a mounting block 34 held in place by cap screw 36. The opposite ends of cable 33 are secured to opposite ends of a cylinder 37 of a double acting hydraulic jack 38 by threaded end parts 39, 41 and nuts 42. The cylinder 37 reciprocates on a fixed piston 46 rigidly connected intermediate the opposite ends of a through rod 47 which in turn is secured at its opposite ends to the frame 13 of the walkie lift truck. The opposite ends of the through piston rod 47 are secured, as by welding, to brackets 48, 49 secured to transversely spaced vertical frame members 51, 52 of the main frame 13 by suitable bolts 53 and nuts 54.

Referring to FIG. 3, a reversible electric motor 61 drawing current from a source of electric energy in the form of a battery 62 is connected in driving relation to a pump 63 which has input-output ports 64, 66 which operate alternately as intake or delivery ports depending on the direction in which the pump is driven by the motor 61. Port 64 of pump 63 is connected to supply port 67 of an automatic flow control valve 68 by way of a conduit 69 and port 66 of pump 63 is connected to a supply port 71 of automatic operating control valve 68 by a conduit 72. The conduits 69, 72 are connected to reservoirs 73, 74, respectively, through check valves 75, 76 to provide makeup fluid. The electric motor 61 is controlled by a pair of push button switches 81, 82 on the control head 85 of control handle 26 which operate forward-reverse motor relays 83, 84. When push button switch 81 is depressed, the pump 63 will be driven in a direction to deliver fluid under pressure to its port 64 and hence, to the supply port 67 in automatic valve 68. The port 67 is connected to an inner cylindrical bore 86 in a housing 87 of valve 68 and pressurizes a chamber 88 to cause a valve spool 89 to move to the right, as viewed in FIG. 3, whereby the land 91 of spool 89 is moved to the right of a passage 92 formed in the body 87. The passage 92 is connected to a delivery port 93 and to chamber 94 of the double acting hydraulic jack 38 by a conduit 96. The spool 89 will have been moved sufficiently to the right to cause land 101 to permit the recessed portion 102 to interconnect delivery passage 103 with passage 104. Thus, fluid exhausted from a chamber 106 of the jack 38 passes to the pump 63 by way of conduit 107, port 108, passage 103, reduced diameter portion 102, passage 104, port 71 and conduit 72. Thus, the reservoirs 73, 74 act only as makeup fluid sources for the hydraulic circuit. A centering spring 111 is provided to maintain the valve spool 89 in its illustrated float position when not subjected to fluid pressure from pump 63. The opposite ends of the spring 111 act against washers 112, 113 which are maintained on the reduced diameter portion 115 of the valve spool 89 by snap rings 114, 116.

When push button 82 is depressed to bridge its associated switch contacts and energize relay 84 the electric motor 61 drives the pump in the opposite direction to supply pressurized fluid to port 71. Pressure fluid passes to chamber 121 at the right end of the bore 86 and causes the valve spool 89 to shift to the left to permit pressure fluid to pass to passage 103, thence through port 108 and conduit 107 to the pressure chamber 106 of the power steering actuator or jack 38. Return fluid from the opposite end of the jack 38, namely, chamber 94, will pass therefrom to the pump 63 by way of passage 92, recess portion 102 and passage 90.

In the centered float position of the valve spool 89, it will be noted that passages 103 and 92 are interconnected by the reduced diameter portion 102 of valve spool 89. Thus, fluid will flow freely between the opposite chambers 94, 106 of the power steering jack 38. This allows the operator to manually steer the power unit 11 without energizing the power steering system and without substantial resistance from the interchange of fluid between the opposite ends of the jack 38.

From the foregoing description it is apparent that a novel dual mode steering system has been provided for a walkie lift truck. The operator may choose power steering when needed by pushing one of two spring biased push button switches on the control handle which operate the forward-reverse motor relays. When the operator releases the push button switch, power assist ceases and the truck is again manually steered. Thus battery energy is used for steering only when deemed necessary by the operator and he must deliberately depress a push button during the time he chooses the power mode of steering. The pump 63 is of a reverse delivery type which delivers pressure fluid from one side when driven in one direction and delivers pressure fluid from the other side when driven in the opposite direction. A gear pump, for instance, is a reverse delivery type pump.

The provision of a through rod double acting jack 38 and cable 33 for the power steering mode of operation, achieves a compact customer option package. By securing the rod ends of the jack to the truck frame and employing a cable secured to opposite ends of the shiftable cylinder and wrapped around the upper part of the power unit, a very direct acting power actuation is achieved. The jack is transversely disposed in a position above the electric motor of the drive unit and below the upper bearing 14. By this choice of actuator and location, a minimum of modification to the existing walkie lift truck is needed to incorporate the selective power steering of this invention.

The embodiments of the invention in which an exclusive property or privilege is claimed are defined as follows:

1. A dual mode steering system for a walkie lift truck of the type having a wheeled power unit pivotally secured to the frame of the truck for steering about a vertical pivot axis and having an elongated control handle connected in manual steering relationship to the control unit, said system comprising:
    a source of electric energy,
    a reversible electric motor,
    a pump connected in driven relation to said reversible motor,
    means for controlling flow of energy from said battery to said electric motor including forward and reverse controls having a pair of switches on said control handle,
    a double acting hydraulic actuator interconnected between said frame and power unit and operable to steer the latter,
    automatic control valve means connected to opposite sides of said actuator and to opposite sides of said pump, said control valve means having a float condition in which said opposite sides of said actuator are in free fluid flow communication with one another and having a pair of actuator operating conditions, and
    means automatically placing said valve means in one of its actuator operating conditions to effect one direction of steering when said pump is operated in one direction and placing said valve means in the other of its actuator operating conditions to effect the opposite direction of steering when said pump is operated in the opposite direction.

2. The invention of claim 1 wherein said actuator is a double acting through rod jack having opposite ends of its rod secured to said frame and having its cylinder connected in steering relation to said power unit.

3. The invention of claim 2 wherein said jack is transversely disposed in relation to said lift truck near the upper part of said power unit.

4. The invention of claim 3 wherein said cylinder is connected to said power unit by flexible motion transmitting means wrapped around an upper cylinderical part of said power unit and connected to opposite ends of said cylinder.

* * * * *